(12) United States Patent
Rolison et al.

(10) Patent No.: US 9,093,721 B2
(45) Date of Patent: Jul. 28, 2015

(54) DUAL-FUNCTION AIR CATHODE NANOARCHITECTURES FOR METAL-AIR BATTERIES WITH PULSE-POWER CAPABILITY

(75) Inventors: Debra R Rolison, Arlington, VA (US); Jeffrey W Long, Alexandria, VA (US); Christopher N. Chervin, Washington, DC (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 486 days.

(21) Appl. No.: 13/245,792

(22) Filed: Sep. 26, 2011

(65) Prior Publication Data

US 2012/0074908 A1    Mar. 29, 2012

Related U.S. Application Data

(60) Provisional application No. 61/386,084, filed on Sep. 24, 2010.

(51) Int. Cl.
    *H01M 12/06*    (2006.01)
(52) U.S. Cl.
    CPC .................................... *H01M 12/06* (2013.01)
(58) Field of Classification Search
    CPC ........................................................ H01M 12/06
    USPC ................................................. 429/403, 405
    See application file for complete search history.

(56) References Cited

U.S. PATENT DOCUMENTS

| 4,007,057 | A | | 2/1977 | Littauer et al. |
| 4,599,157 | A | * | 7/1986 | Suzuki et al. ............. 204/192.15 |
| 4,894,296 | A | | 1/1990 | Borbely et al. |
| 5,308,711 | A | | 5/1994 | Passaniti et al. |
| 5,318,862 | A | * | 6/1994 | Liu et al. ........................ 429/406 |
| 6,010,606 | A | * | 1/2000 | Denton et al. ................ 204/284 |
| 6,127,061 | A | | 10/2000 | Shun et al. |
| 6,194,099 | B1 | * | 2/2001 | Gernov et al. ................ 429/213 |
| 6,387,553 | B1 | | 5/2002 | Putt et al. |
| 6,444,609 | B1 | * | 9/2002 | Golovin ........................ 502/324 |
| 6,780,347 | B2 | | 8/2004 | Ndzebet |
| 7,724,500 | B2 | | 5/2010 | Long et al. |
| 7,807,304 | B2 | * | 10/2010 | Fiedler .......................... 429/405 |
| 2001/0036570 | A1 | * | 11/2001 | Tosco et al. ...................... 429/41 |
| 2003/0049517 | A1 | | 3/2003 | Hampden-Smith et al. |
| 2003/0173548 | A1 | * | 9/2003 | Ndzebet et al. .............. 252/500 |
| 2006/0063051 | A1 | * | 3/2006 | Jang ............................... 429/29 |

(Continued)

OTHER PUBLICATIONS

Bélanger et al., "Manganese Oxides: Battery Materials Make the Leap to Electrochemical Capacitors." Interface 17 (1), 49 (2008).

(Continued)

*Primary Examiner* — Ula C Ruddock
*Assistant Examiner* — Scott J Chimelecki
(74) *Attorney, Agent, or Firm* — US Naval Research Laboratory; Joseph T. Grunkemeyer

(57) ABSTRACT

Disclosed herein is a metal-air battery having a cathode, an anode, and an electrolyte. The cathode has a cathode current collector and a composite of a porous carbon structure and a pseudocapacitive coating. The coating does not completely fill or obstruct a majority of the pores, and the pores can be exposed to a gas. The electrolyte is in contact with the anode and permeates the composite without completely filling or obstructing a majority of the pores.

22 Claims, 8 Drawing Sheets

Carbon nanostructure
($\sigma \sim 10 - 100$ S cm$^{-1}$)

MnO$_x$ deposits
($\sigma \sim 10^{-6}$ S cm$^{-1}$)

(56) References Cited

U.S. PATENT DOCUMENTS

| | | | |
|---|---|---|---|
| 2006/0147775 A1* | 7/2006 | Fiedler | 429/27 |
| 2008/0045616 A1* | 2/2008 | Wu et al. | 521/27 |
| 2008/0247118 A1* | 10/2008 | Long et al. | 361/502 |
| 2009/0239113 A1* | 9/2009 | Hase et al. | 429/27 |
| 2011/0027664 A1* | 2/2011 | Burchardt et al. | 429/403 |

OTHER PUBLICATIONS

Cao et al., "The mechanism of oxygen reduction on $MnO_2$-catalyzed air cathode in alkaline solution" Journal of Electroanalytical Chemistry 557 (2003) 127-134.

Danilov et al., "Carbon nanotubes modified with catalyst—Promising material for fuel cells" Journal of Power Sources 163 (2006) 376-381.

Dong et al., "A structure of $MnO_2$ embedded in CMK-3 framework developed by a redox method" Microporous and Mesoporous Materials 91 (2006) 120-127.

Fischer et al., "Incorporation of homogeneous, Nanoscale $MnO_2$ within Ultraporous Carbon Structures via Self-Limiting Electroless Deposition: Implications for Electrochemical Capacitors", Nano Lett. 7 (2007) 281-286.

Fischer et al., "Electroless Deposition of Nanoscale $MnO_2$ on Ultraporous Carbon Nanoarchitectures: Correlation of Evolving Pore-Solid Structure and Electrochemical Performance" Journal of the Electrochemical Society, 155 (3) A246-A252 (2008).

Lima et al., "Investigations of the catalytic properties of manganese oxides for the oxygen reduction reaction in alkaline media" Journal of Electroanalytical Chemistry 590 (2006) 152-160.

Long et al., "Multifunctional carbon nanoarchitectures as air-breathing cathodes for primary and rechargeable metal-air batteries" 218th ECS Meeting, Oct. 10-Oct. 15, 2010, Las Vegas, NV.

Long et al., "Architectural Design, Interior Decoration, and Three-Dimensional Plumbing en Route to Multifunctional Nanoarchitectures" Acc. Chem. Res. 2007, 40, 854-862.

Long et al., "Multifunctional $MnO_2$-Carbon Nanoarchitectures Exhibit Battery and Capacitor Characteristics in Alkaline Electrolytes" J. Phys. Chem. C Lett., 113 (2009) 17595-17598.

Roche et al., "Carbon-Supported Manganese Oxide Nanoparticles as Electrocatalysts for the Oxygen Reduction Reaction (ORR) in Alkaline Medium: Physical Characterizations and ORR Mechanism" J. Phys. Chem. C 2007, 111, 1434-1443.

Rolison et al., "Multifunctional 3D nanoarchitectures for energy storage and conversion" Chem. Soc. Rev., 2009, 38, 226-252.

Wang et al., "High Electrocatalytic Performance of $Mn_3O_4$/Mesoporous Carbon Composite for Oxygen Reduction in Alkaline Solutions" Chem. Mater. 2007, 19, 2095-2101.

Zhu et al., "New structures of thin air cathodes for zinc-air batteries" Journal of Applied Electrochemistry 33: 29-36, 2003.

Search report and written opinion in PCT/US11/53330 (Jan. 20, 2012).

* cited by examiner

DUAL-FUNCTION AIR CATHODE NANOARCHITECTURES FOR METAL-AIR BATTERIES WITH PULSE-POWER CAPABILITY

This application claims the benefit of U.S. Provisional Application No. 61/386,084, filed on Sep. 24, 2010. The provisional application and all other publications and patent documents referred to throughout this nonprovisional application are incorporated herein by reference.

TECHNICAL FIELD

The present disclosure is generally related to metal-air batteries.

DESCRIPTION OF RELATED ART

Metal-air batteries rely on molecular oxygen, typically from the atmosphere, as a primary reactant, with $O_2$ electrocatalytically reduced at a thin lightweight "air cathode" to electrochemically balance the oxidation of a bulk metal such as Zn at the negative electrode. As a result of this asymmetric cell design with minimized cathode mass and volume, the specific energy densities of metal-air cells often exceed those of batteries that require two bulk-phase electrodes. For example, primary Zn-air cells can provide energy densities in excess of 300 $Whkg^{-1}$ and 650 $WhL^{-1}$ (*Handbook of Batteries: Second Edition*, D. Linden, Ed.; McGraw-Hill, Inc., New York (1995), Chapter 13; Sapkota et al., *J. Ind. Eng. Chem.* 15, 445 (2009)). The principal disadvantage of metal-air batteries is relatively low power density, which can be ascribed to various processes within the metal-air cell configuration including the oxidation rate at the metal anode, the innate oxygen reduction reaction (ORR) activity of the air cathode, and the flux of available $O_2$ to the air cathode. Most of the previous effort to improve the power performance of metal-air batteries focused on optimizing the structure and activity of the air cathode, which is typically based on high-surface-area carbons. Although molecular oxygen can be electrochemically reduced at carbon surfaces, particularly when using alkaline electrolytes, the addition of other electrocatalysts, including manganese oxides (Roche et al., *J. Phys. Chem. C* 111, 1434 (2007); Lima et al., *Electrochim. Acta* 52, 3732 (2007)), to the carbon-based air cathode ultimately improves both the current density and operating voltage when incorporated in metal-air batteries, resulting in higher power density relative to carbon-only air cathodes. The physical structure of the air cathode is also crucial for electrochemical performance. Most conventional air-cathode structures are prepared via a traditional "brick-and-mortar" fabrication approach based on mixing and pressing powders of carbon, catalyst particles, and a polymeric binder into a composite electrode that exhibits an ad-hoc porous structure. Although certainly functional, the conventional powder-composite electrode design is far from optimized for operation as the cathode of a metal-air cell.

Conventional Zn-air batteries can be paired with a high-power electrochemical device, such as an electrochemical capacitor, to assemble a hybrid device that is capable of providing both high energy density and pulse-power capability. The hybrid-device approach does introduce complexity in terms of the power-management electronics that may be required to monitor, control, and coordinate the functions of the discrete battery and capacitor components. The need for a discrete high-power component also adds additional cost, mass, and volume to the ultimate energy-storage device.

A class of materials termed "multifunctional" electrode nanoarchitectures has been developed (Rolison et al., *Chem. Soc. Rev.* 38, 226 (2009)) that are based on fiber-supported carbon nanofoam papers into which electroactive moieties (metal oxides, polymers, metal nanoparticles) are incorporated as conformal coatings or deposits onto the exterior and interior surfaces of the carbon nanofoam to impart specific functionality to the resulting electrode structure (e.g., charge storage or electrocatalytic activity). This general design philosophy can be directed to produce high-performance electrode materials for applications ranging from electrochemical capacitors and Li-ion batteries to PEM fuel cells and semi-fuel cells. One such material incorporates conformal, ultrathin (<20 nm) coatings of electroactive manganese oxide onto the walls of carbon nanofoam substrates (FIG. 1) (Fischer et al., *Nano Lett.* 7, 281 (2007); Long et al., U.S. Pat. No. 7,724,500)).

Manganese oxides, herein designated generically as "MnOx", are charge-insertion materials that serve as active charge-storage phases in electrochemical devices ranging from primary $Zn/MnO_2$ alkaline cells (Chabre et al., *Prog. Solid State Chem.* 23, 1 (1995)) to rechargeable Li-ion batteries (Thackeray, *Prog. Solid State Chem.* 25, 1 (1997)), and electrochemical capacitors (Bélanger et al., *Interface* 17(1), 49 (2008)). The electroless MnOx deposition process was developed to produce high-performance electrode structures for aqueous-electrolyte electrochemical capacitors. The charge-storage capacities (expressed as electrochemical pseudocapacitance) of the MnOx could be efficiently accessed when it was distributed as a nanoscale coating on a 3-D porous current collector, such as a carbon nanofoam (Fischer et al., *Nano Lett.* 7, 281 (2007); Long et al., *J. Phys. Chem. C* 113, 17595 (2009)).

BRIEF SUMMARY

Disclosed herein is a metal-air battery comprising: a cathode, an anode, and an electrolyte. The cathode comprises: a cathode current collector and a composite comprising a porous carbon structure comprising a surface and pores and a coating on the surface comprising a pseudocapacitive material. The coating does not completely fill or obstruct a majority of the pores, and the battery is configured with the capability to expose the pores to a gas. The electrolyte is in contact with the anode and permeates the composite without completely filling or obstructing a majority of the pores.

BRIEF DESCRIPTION OF THE DRAWINGS

A more complete appreciation of the invention will be readily obtained by reference to the following Description of the Example Embodiments and the accompanying drawings.

DETAILED DESCRIPTION OF EXAMPLE EMBODIMENTS

Figure 1:
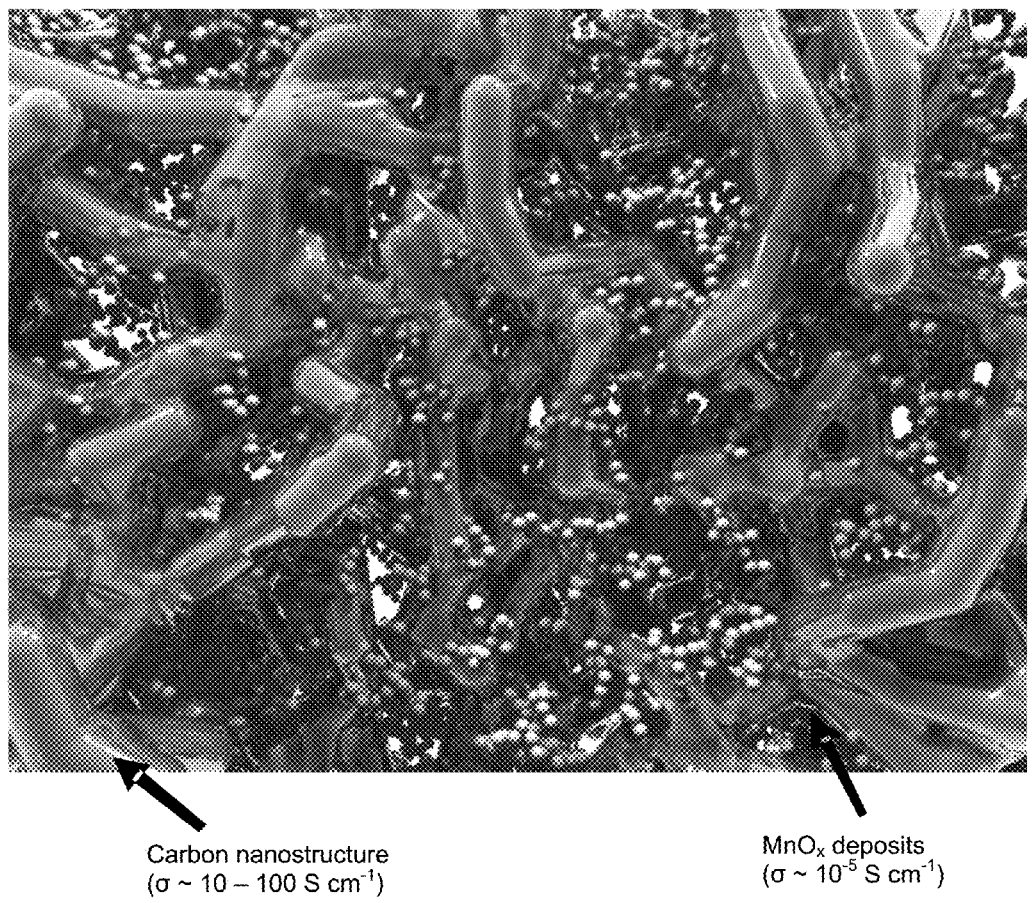
FIG. 1 shows a schematic of hybrid electrode structure comprising a highly porous carbon nanostructure coated with nanoscopic MnOx deposits. Note the distinction in the typical electrical conductivities (σ) of the carbon and MnOx components.

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

Both ORR activity and pseudocapacitance functionalities can be realized in the same MnOx-carbon electrode structure, with the ORR supporting longer-term energy delivery, while the MnOx pseudocapacitance supports intermittent short-term discharge pulses even in the absence of oxygen. Both functions may be achieved in one structure, configured as an air cathode for operation in an alkaline-electrolyte metal-air battery.

The "dual-function" aspect is not limited to carbon nanofoam-based electrode structures, but may also be observed for related porous carbon structures (e.g., carbon nanotube assemblies) that are carefully decorated with nanoscale MnOx of the appropriate phase. Further, any other pseudocapacitive material that can be coated on the surfaces of the pores may be used. A pseudocapacitive material is one that is capable of double-insertion of both electronic charge and ionic charge. The electronic charge may be electrons or holes and the ionic charge may be cations or anions. Other relevant materials that exhibit pseudocapacitance in the alkaline electrolytes include, but are not limited to, conducting polymers, cobalt oxides, nickel oxides, and iron oxides. Further, the MnOx pseudocapacitive materials described herein may also contain other metals (e.g., Fe, V, Ni, Co, Bi). The pseudocapacitive material may also be an ORR catalyst, though the ORR can occur on carbon alone.

The feasibility of engaging the electrochemical capacitance of carbon nanofoam-based air cathodes as a source of oxygen-independent periodic pulse power to augment the long-term, low-power energy delivery that is provided by the ORR in the same air-cathode structure has been demonstrated. The "dual-function" aspect of said air cathodes is enabled by fabricating a multifunctional electrode architecture comprising a highly porous carbon nanofoam substrate that is subsequently coated with conformal, ultrathin (<20 nm) deposits of manganese oxides (MnOx). The MnOx coatings not only enhance the ORR kinetics in the electrode structure and lower the overpotential required for the reduction, but also contribute additional electrochemical charge storage via pseudocapacitance reactions that can be accessed even in oxygen-free conditions for pulse-power delivery on timescales of a few seconds. Once discharged (reduced) in an electrochemical pulse, the MnOx coatings may spontaneously re-oxidize by exposure to oxygen diffusing through the air cathode structure, such that the pseudocapacitance of the ultrathin MnOx is again available for subsequent pulse-power discharges as needed. The MnOx-coated carbon nanofoam substrates described herein can be readily fabricated and scaled in length, width, and thickness to dimensions that enable their use in practical metal-air battery configurations.

The MnOx-carbon nanofoam air cathodes described herein can exhibit multiple functionalities—electrocatalytic activity for oxygen reduction plus faradaic pseudocapacitance for charge storage—a phenomenon that has not been previously reported in a single electrode material. The pseudocapacitive charge storage associated with the nanoscale MnOx coating is available for pulse discharge on the order of a few seconds, and can be spontaneously regenerated in the presence of oxygen. Once recharged, the MnOx pseudocapacitance can be accessed for a short power pulse even when the oxygen supply to the battery has been interrupted. The additional functionality from the MnOx pseudocapacitance is achieved without adding significant weight or volume to the ultimate metal-air battery. These particular nanofoam-based air materials are also readily fabricated and easily scaled in size to serve as "plug-and-play" air cathodes in practical metal-air batteries.

The battery includes the cathode current collector, the composite material, the anode, and the electrolyte. Any configuration may be used that allows electrical contact such that the device acts a battery. For example, the cathode current collector and the composite may both be planar, with the composite exposed to the air or to a source gas. In order to allow both air and the electrolyte to contact the composite, the battery may be configured with perforations in the cathode current collector to allow the passage of either air or electrolyte through the hole and to the composite. The composite may at times be sealed from contact with gases, but any such seal would be removable. The composite may be exposed to, for example, ambient air or a source of gaseous oxygen, such as a tank of oxygen.

The porous carbon structure contains pores that are generally interconnected to allow a gas to permeate through the structure. The portions of the structure that line the pores are referred to as the surface. Suitable carbon structures include, but are not limited to, a carbon aerogel, a carbon nanofoam, a carbon xerogel, a templated mesoporous carbon, a templated macroporous carbon, and a carbon nanotube/nanofiber assembly. Suitable pore diameters may include, but are not limited to, about 2 nm to about 1 μm.

Any pseudocapacitive material may be used to coat the pores, including but not limited to, MnOx, an oxide, a polymer, or a ceramic. The coating does not completely fill or obstruct a majority of the pores. A pore is obstructed when a gas is not able to flow into and/or through the pore. Thus gas is still able to permeate the coated composite. The coating may be formed by, for example, a self-limiting process such as self-limiting electroless deposition, as described below. By this technique, the coating does not become too thick. Suitable coating thickness may include, but are not limited to, less than about 50 nm, 20 nm, and 10 nm.

As disclosed in Rolison et al., *Chem. Soc. Rev.* 38, 226 (2009), pseudocapacitive ruthenuia ($RuO_2$) can be deposited onto an aerogel surface by electroless deposition. The aerogel is infiltrated with a solution of the precursor $RuO_4$ in pentane at −77° C. The process generates a self-wired metallic, air- and water-stable $RuO_2$ nanoweb.

The electrolyte also permeates the composite but, as with the coating, it does not fill or obstruct a majority of the pores. The electrolyte is also in contact with the anode. Both aqueous and nonaqueous electrolytes may be used including, but not limited to, aqueous KOH, aqueous alkaline hydroxide, aqueous electrolyte or polymer having a pH≥8, and a non-aqueous liquid or gel of sufficient dielectric constant to dissociate salts soluble in the liquid or gel.

A circuit may be formed by electrically connecting an electrical load to the anode and the cathode current collector. The battery can then supply a current to the load when the composite is exposed to oxygen. This occurs by reduction of the oxygen and oxidation of the anode. Pulse power may also be supplied by discharging the cathode by reduction of the coating. This may occur with or without oxygen. Oxygen may then be used to oxidize the partially discharged coating.

The following examples are given to illustrate specific applications. These specific examples are not intended to limit the scope of the disclosure in this application.

Example 1

Synthesis of Carbon Nanofoams

The carbon nanofoam papers were fabricated by infiltrating a carbon fiber-paper (Lydall Technimat®) with a resorcinol-formaldehyde (RF) sol followed by curing, drying, and pyrolysis. The sol was prepared by combining resorcinol, formaldehyde, water, and sodium carbonate (catalyst) in a capped glass jar with stirring for 30 min followed by ageing for 3 h. The molar ratio of resorcinol to catalyst and the weight percent of resorcinol and formaldehyde in the solution are adjusted to tune the average pore size of the resulting carbon nanofoam. Carbon fiber-papers were immersed in the aged sol, vacuum infiltrated, and then sandwiched between glass slides and sealed with duct tape. The sealed samples were cured overnight under ambient conditions and then placed in a steam environment at 80° C. for ~24 h. The samples were then rinsed in water for 1-3 h, followed by rinsing in acetone for 1-2 h, and subsequent drying in air for 4 h. The RF-nanofoam papers were pyrolyzed under flowing Ar in a tube furnace at 1000° C. for 2 h.

Example 2

Synthesis of MnOx-Modified Carbon Nanofoams

Figure 2:
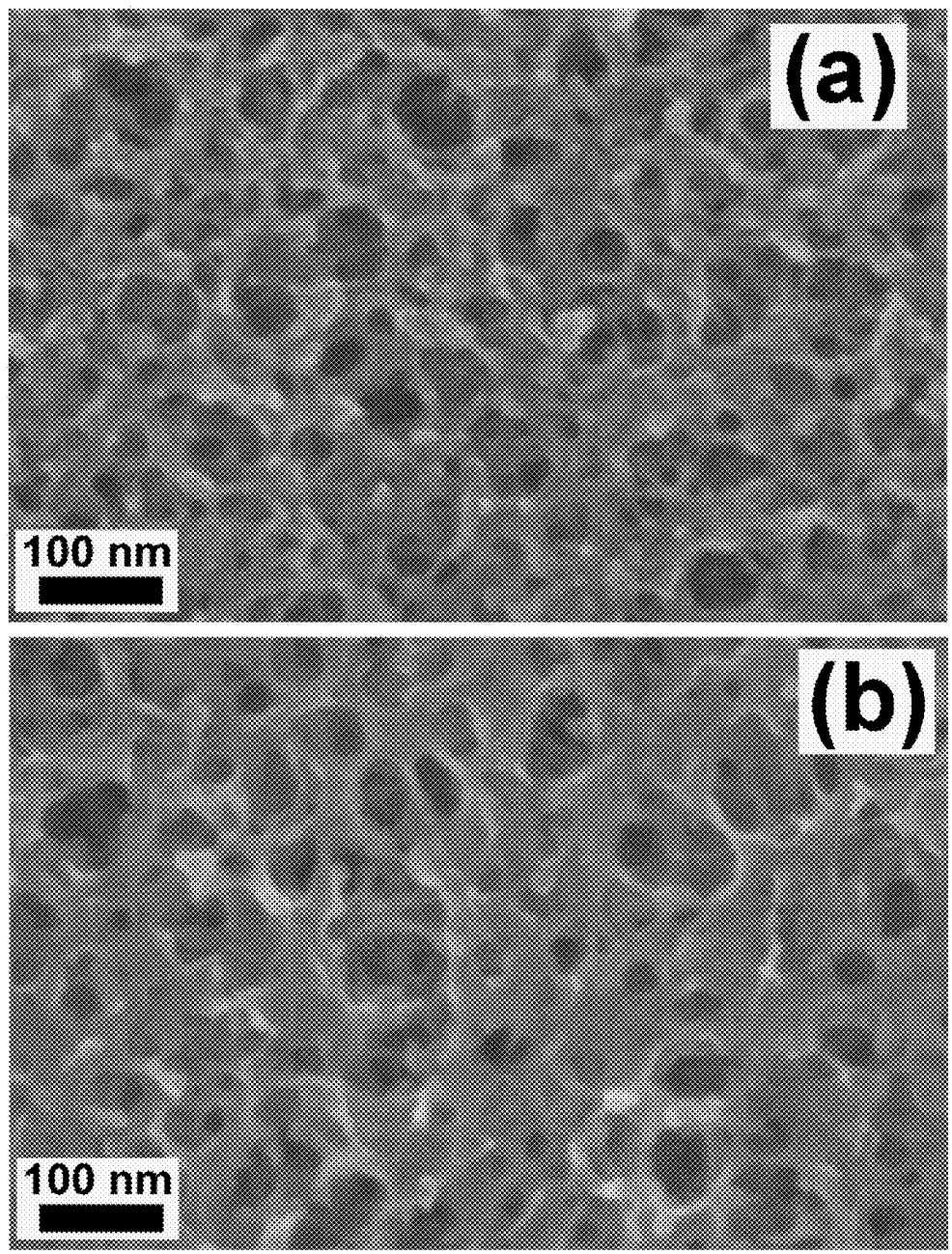
FIG. 2 shows scanning electron micrographs of (a) an as-synthesized carbon nanofoam and (b) a MnOx-modified carbon nanofoam heated to 120° C. in air. The pearl-necklace morphology and through-connected pore network of the bare carbon nanofoam is retained after MnOx deposition.

Manganese oxide-modified carbon nanofoams were prepared via self-limiting electroless deposition of MnOx onto the interior and exterior walls of the carbon nanofoam such that the through-connected pore network was retained (Fischer et al., *Nano Lett.* 7, 281 (2007); Long et al., U.S. Pat. No. 7,724,500). The pyrolyzed carbon nanofoams were vacuum infiltrated with a 0.1 M solution of $Na_2SO_4$ to wet the interior surfaces of the porous, hydrophobic nanofoam, followed by soaking in a solution of 0.1 M $NaMnO_4$ in 0.1 M $Na_2SO_4$ for 60 min. The MnOx-coated carbon nanofoams were then rinsed copiously with 18 MΩ cm $H_2O$ and dried at 40° C. under flowing nitrogen overnight followed by calcination at 120° C. for 4 h in static air. Representative scanning electron microscopy images of MnOx-modified and unmodified carbon nanofoams are shown in FIG. 2.

Example 3

Air-Cathode Cell Configuration

Figure 3:
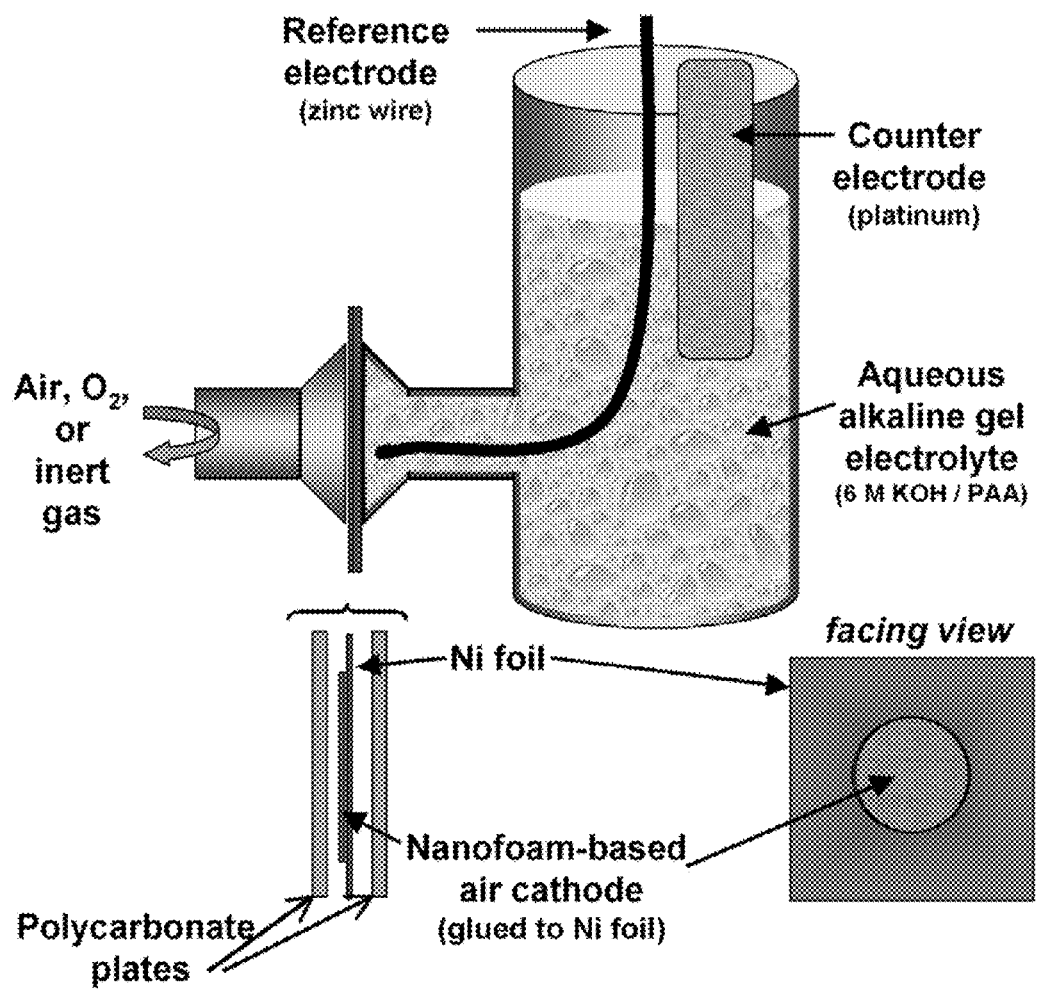
FIG. 3 shows a diagram of the air-cathode cell for testing dual function of carbon nanofoam-based electrodes.

The electrochemical behavior of MnOx-modified and unmodified carbon nanofoams were characterized in a three-electrode cell configured to mimic the conditions of an alkaline metal-air battery (See FIG. 3), but with independent potential/current control of the air cathode with respect to a reference and counter electrode. The nanofoam cathode (8×8 $mm^2$) was attached with carbon epoxy to a Ni-flag current collector (perforated with a 6.2-mm hole in the center) such that the nanofoam completely covered the perforation. The nanofoam-Ni-flag assembly was then sandwiched between two plastic plates (Lexan 9034 standard), which were also perforated with 6.2-mm holes cut to align with the Ni-flag current collector. Additionally, Viton O-rings were placed around the holes between the plastic plates and the Ni-flag and the entire assembly was compressed via hand-tightened screws connecting the two plastic plates at their four corners (outside of the O-rings). Electrical contact was made via a tab on the Ni-flag that extended beyond the dimensions of the electrode assembly. The finished electrode assembly was sandwiched between two glass compartments fitted with Viton O-rings and the entire cell was held together with zip-ties tightened sufficiently to assure that the electrolyte did not leak from its compartment. One compartment of the cell was filled with the electrolyte while the other compartment was exposed to flowing argon, flowing oxygen, or opened to static air.

Example 4

Electrochemical Measurements

Figure 4:
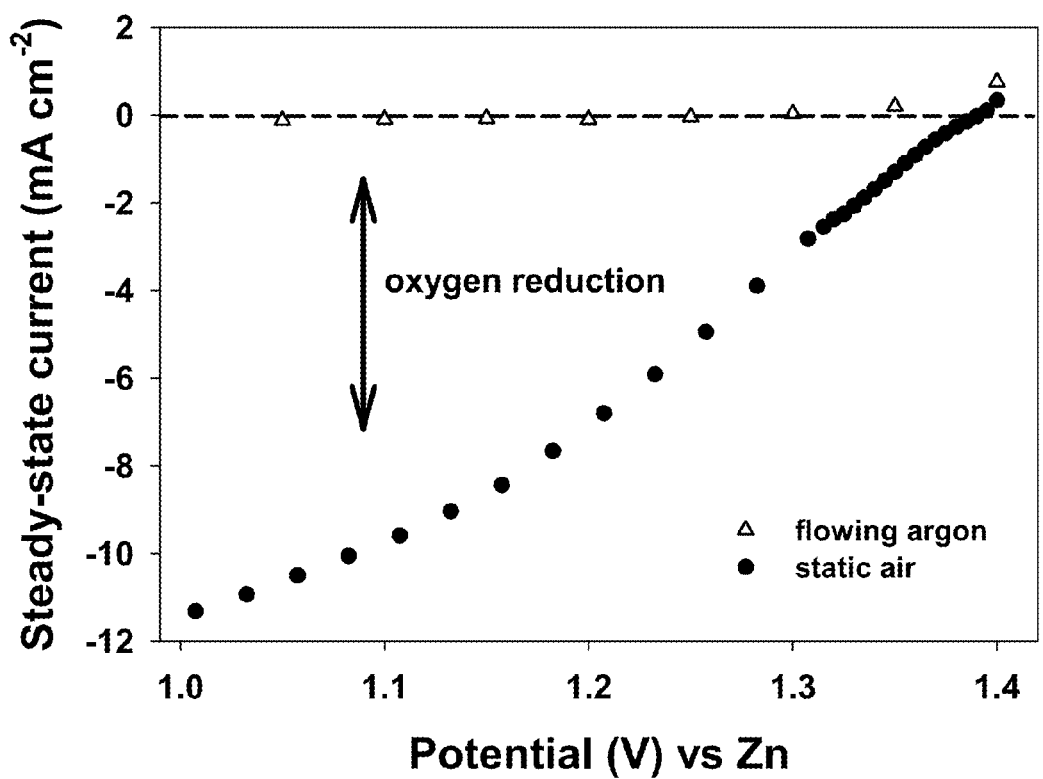
FIG. 4 shows chronoamperometry in 6 M KOH/poly (acrylic acid) electrolyte in Argon vs. static air for a MnOx-modified carbon nanofoam heated to 120° C. in air. The area of the circular hole cut in the Ni foil current collector was used to normalize the current.
Figure 5:
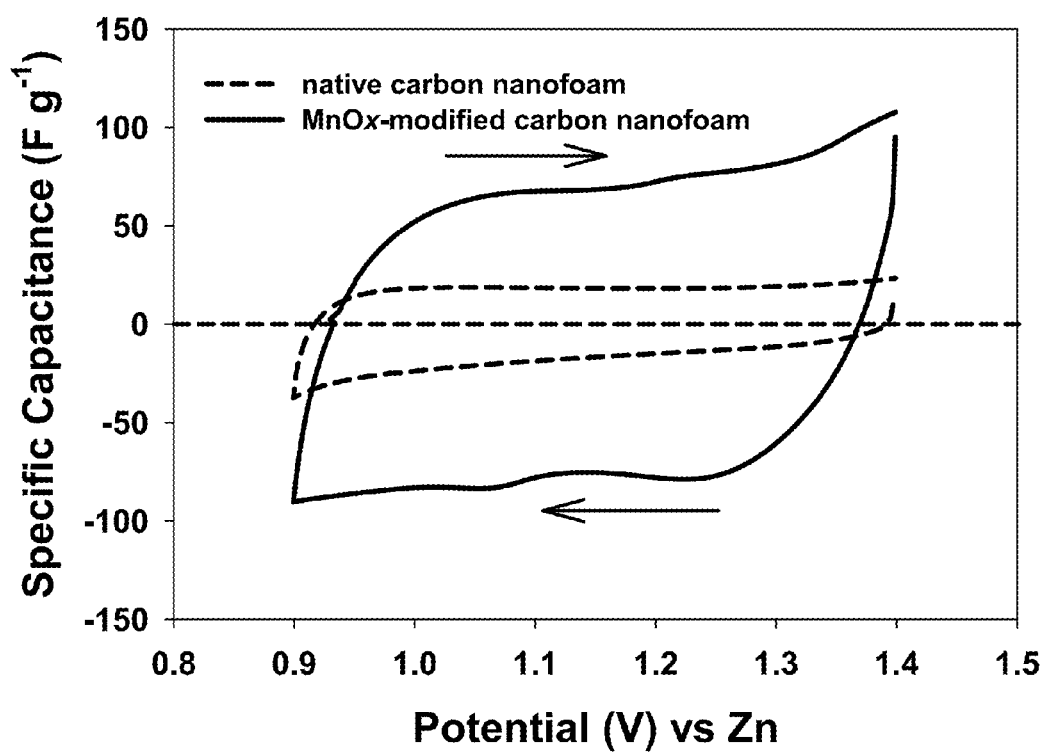
FIG. 5 shows cyclic voltammograms of ( - - - ) native carbon nanofoam and (-) MnOx-modified carbon nanofoam heated to 120° C. in air, and then equilibrated with 6 M KOH/PAA gel electrolyte, scanning at 5 mV s$^{-1}$, and with the electrode bathed in flowing argon. The y-axis is expressed in terms of specific capacitance, as normalized to the total mass of the respective electrodes.

Electrochemical measurements were made in an alkaline gel electrolyte prepared by dissolving 6 wt % poly(acrylic acid) in 6 M KOH. A Zn wire reference electrode (1.43 V vs. Hg/HgO) and a Pt auxiliary electrode were placed in the electrolyte compartment. The oxygen-reduction activity of the cathode was determined before pulse power measurements were made. For oxygen-reduction activity, the potential was stepped in increments between 1.4 and 1.0 V vs. Zn and the steady-state current was determined once the capacitive current of the electrode had decayed. Representative steady-state current-potential data for MnOx-modified and unmodified carbon nanofoams are shown in FIG. 4. Following the chronoamperometric measurements, cyclic voltammograms from 1.4 to 1.0 V vs. Zn were recorded to determine the capacitance of the partially flooded cathode. Cyclic voltammograms for MnOx-modified and unmodified carbon nanofoams with the y-axis expressed as specific capacitance (calculated from the measured current) are shown in FIG. 5. The area of the electrode used to normalize activity was taken as the area of the perforation in the Ni-flag (0.30 $cm^2$). The total mass of the nanofoam electrode was used to determine the specific capacitance.

Pulse-power measurements were made in flowing Ar, flowing $O_2$, or static air using a current-voltage-time protocol consisting of potentiostatic conditioning, galvanostatic discharge, and open-circuit (null current conditions) recovery. The cathodes were initially conditioned at 1.4 V vs. Zn for 20 min and then discharged at −10 mA (to a limit of 0.9 V vs. Zn) followed by a rest step at open circuit (i.e., with no external driving force from the potentiostat) for 20 min. The discharge-open-circuit steps were repeated until three discharge-recovery cycles were recorded.

Figure 6:
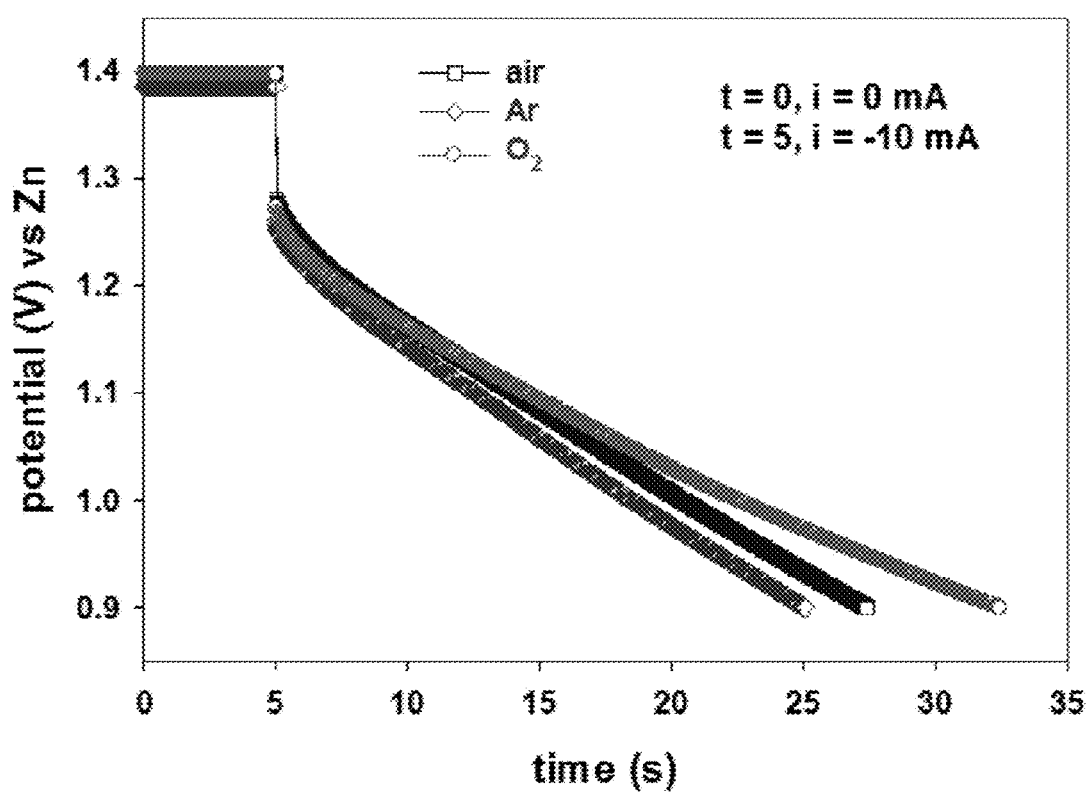
FIG. 6 shows initial discharge at −10 mA for a MnOx-modified carbon nanofoam in air, Ar, or $O_2$ following conditioning at 1.4 V vs. Zn. in 6 M KOH/PAA gel electrolyte.
Figure 7:
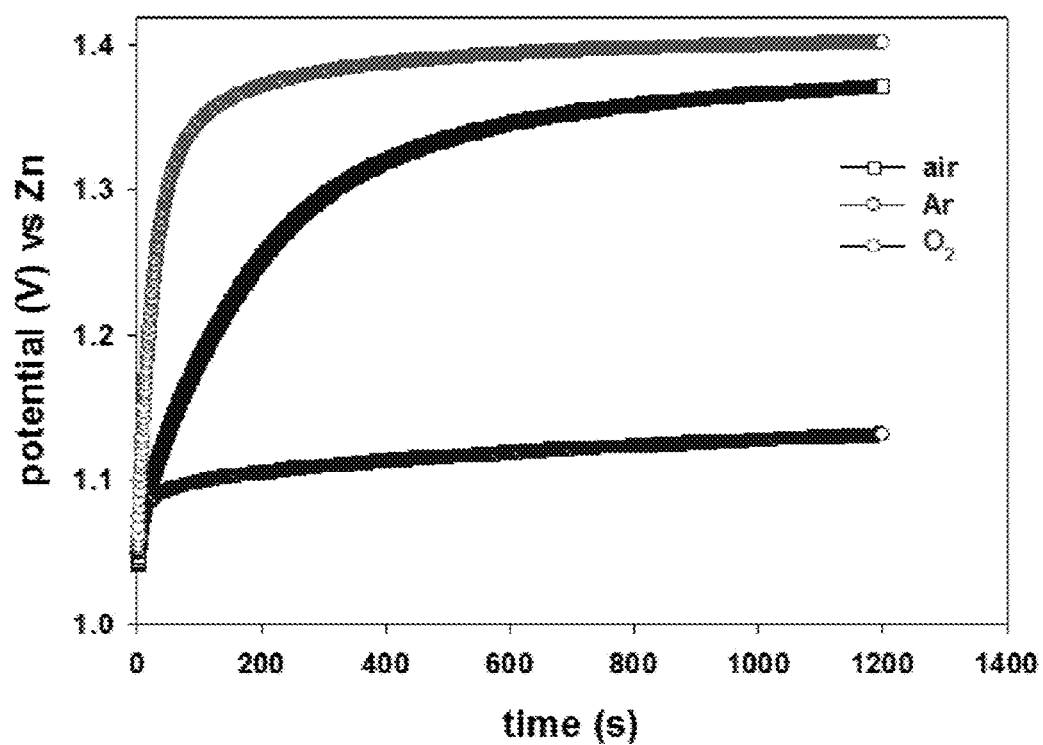
FIG. 7 shows open-circuit recovery of a MnOx-modified carbon nanofoam in air, Ar, or $O_2$ following discharge at −10 mA to a limit of 0.9 V vs. Zn in 6 M KOH/PAA gel electrolyte.
Figure 8:
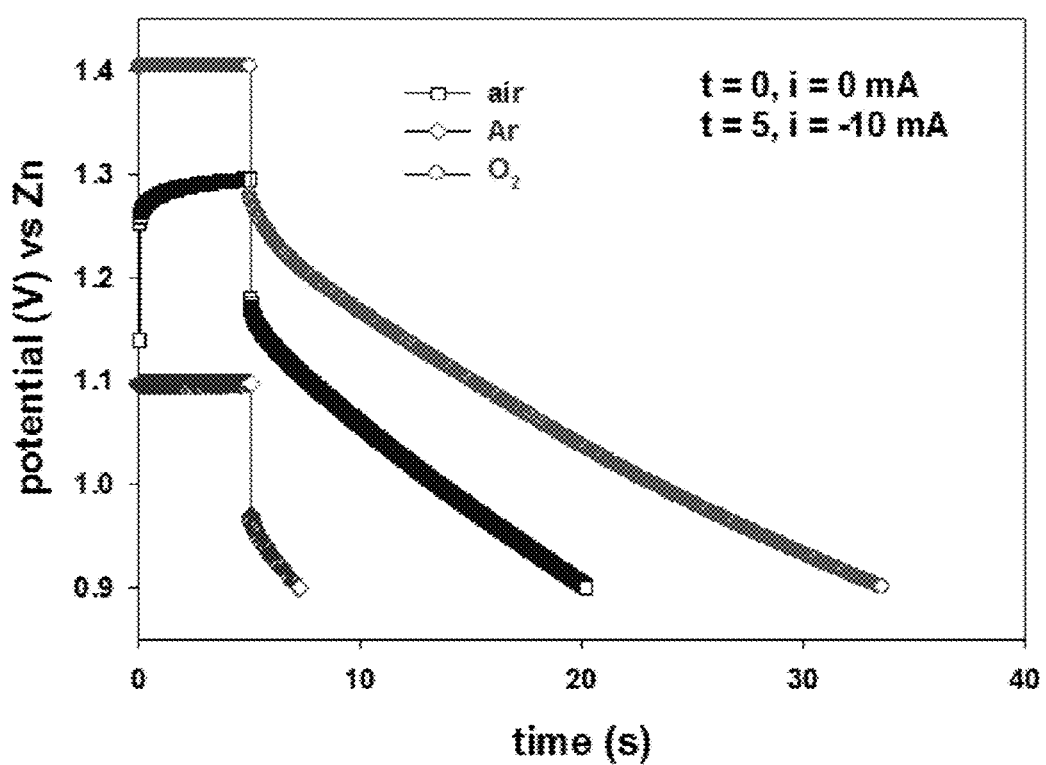
FIG. 8 shows the third discharge at −10 mA for a MnOx-modified carbon nanofoam in air, Ar, or $O_2$ following open-circuit recovery in 6 M KOH/PAA gel electrolyte

Discharging the MnOx-carbon nanofoam electrode at −10 mA (to a limit of 0.9 V) under an atmosphere of static air, flowing $O_2$, or flowing argon after potentiostatic conditioning at +1.4 V vs. Zn generated the data seen in FIG. 6 (discharge initiated at t=5 s in the plot). The discharge profiles in argon, air, and $O_2$ are similar with some additional capacity noted in the presence of $O_2$, due to a small contribution to the current from concomitant $O_2$ reduction as catalyzed at the MnOx. Following this initial pulsed discharge, the electrode was allowed to float at open circuit for 20 min while the open-circuit potential (OCP) was monitored. The effect of $O_2$ on the chemical state of the MnOx and thus the electrode potential is obvious from the increase in potential with time (FIG. 7), particularly in the case of pure $O_2$ flow, whereas the change in OCP and recovery of the charged state of the oxide is minimal under flowing argon. After 20 min of open-circuit "recovery" under the respective atmospheres, the MnOx-carbon nanofoam electrode was subjected to another galvanostatic discharge at −10 mA. While the electrode exposed to flowing argon has almost no residual capacity (FIG. 8), exposing pulse-discharged MnOx-carbon at open circuit to $O_2$ (in static air or under $O_2$ flow) shows recovery of significant discharge capacity (noted by a longer discharge time), indicating that the MnOx reduced under pulse discharge has been substantially regenerated by simply exposing the electrode to molecular oxygen. The fastest recovery and longest discharge pulse occur when bathing the electrode in pure $O_2$, but even under static air, the MnOx-carbon electrode recovers much of its charge, to be delivered in subsequent discharge cycles. Three such discharge-recovery cycles were performed in each gas flow, with reproducible results (FIG. 8 shows the third discharge).

Obviously, many modifications and variations are possible in light of the above teachings. It is therefore to be understood that the claimed subject matter may be practiced otherwise than as specifically described. Any reference to claim elements in the singular, e.g., using the articles "a," "an," "the," or "said" is not construed as limiting the element to the singular.

What is claimed is:

1. A metal-air battery comprising:
   a cathode comprising:
      a cathode current collector; and
      a porous composite comprising:
         a porous carbon substrate that is not a powder comprising a surface and pores; and
         a coating on the surface comprising MnOx or $RuO_2$;
            wherein the coating does not completely fill or obstruct a majority of the pores; and
            wherein the battery is configured with the capability to expose the pores to a gas;
   an anode; and
   an electrolyte in contact with the anode and permeating the composite without completely filling or obstructing a majority of the pores;
      wherein the pores are interconnected to allow a gas to permeate through the composite.

2. The metal-air battery of claim 1, wherein the coating is formed by self-limiting electroless deposition.

3. The metal-air battery of claim 1, wherein the coating comprises $RuO_2$.

4. The metal-air battery of claim 1, wherein the coating comprises MnOx.

5. The metal-air battery of claim 1, wherein the carbon substrate is a carbon aerogel.

6. The metal-air battery of claim 1, wherein the carbon substrate is a carbon nanofoam, a carbon xerogel, a templated mesoporous carbon, or a templated macroporous carbon.

7. The metal-air battery of claim 1, wherein the pores have an average diameter of from about 2 nm to about 1 micron.

8. The metal-air battery of claim 1, wherein the coating has a thickness of less than about 50 nm.

9. The metal-air battery of claim 1, wherein the coating has a thickness of less than about 20 nm.

10. The metal-air battery of claim 1, wherein the composite is exposed to gaseous oxygen.

11. The metal-air battery of claim 1, wherein the composite is exposed to ambient air.

12. The metal-air battery of claim 1, wherein the electrolyte comprises aqueous alkaline hydroxide.

13. The metal-air battery of claim 1, wherein the electrolyte is an aqueous electrolyte having a pH of at least 8.

14. The metal-air battery of claim 1, wherein the electrolyte is an aqueous-based polymer electrolyte having a pH of at least 8.

15. The metal-air battery of claim 1, wherein the electrolyte is a nonaqueous liquid or a nonaqueous-based gel of sufficient dielectric constant to dissociate salts soluble in the liquid or gel.

16. A circuit comprising:
   the metal-air battery of claim 1; and
   an electrical load electrically attached to the anode and the cathode current collector.

17. A method comprising:
   providing the circuit of claim 16;
   exposing the composite to gaseous oxygen; and
   allowing the load to draw a current from the battery by reduction of the oxygen and oxidation of the anode.

18. A method comprising:
   providing the circuit of claim 16; and
   discharging the cathode by reduction of the coating to produce a partially discharged coating.

19. The method of claim 18, wherein the composite is exposed to gaseous oxygen.

20. The method of claim 18, wherein the composite is not exposed to gaseous oxygen.

21. The method of claim 18, further comprising:
   exposing the composite to gaseous oxygen; and
   allowing the oxygen to oxidize the partially discharged coating.

22. The metal-air battery of claim 1, wherein the carbon substrate is a carbon nanotube/nanofiber assembly.

* * * * *